W. B. WILLIAMS.
JUICE EXTRACTOR.
APPLICATION FILED SEPT. 6, 1910.
980,466.
Patented Jan. 3, 1911.
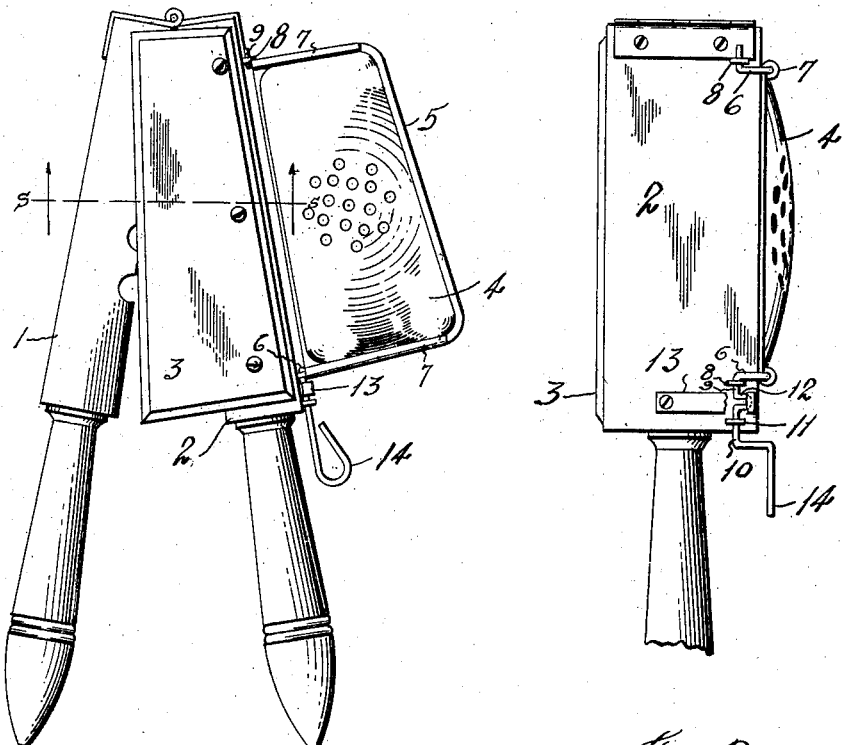
WITNESSES:
L. E. Noack.
J. B. Bowling.
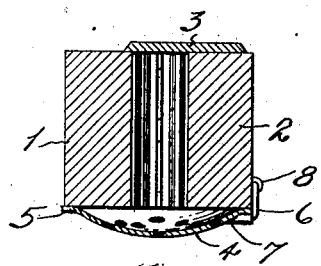
INVENTOR
W. B. Williams
BY Jack Schley.
ATTORNEY

UNITED STATES PATENT OFFICE.

WINFIELD B. WILLIAMS, OF WAXAHACHIE, TEXAS.

JUICE-EXTRACTOR.

980,466.　　　　Specification of Letters Patent.　　Patented Jan. 3, 1911.

Application filed September 6, 1910. Serial No. 580,652.

*To all whom it may concern:*

Be it known that I, WINFIELD B. WILLIAMS, citizen of the United States, residing at Waxahachie, in the county of Ellis and State of Texas, have invented certain new and useful Improvements in Juice-Extractors, of which the following is a specification.

This invention relates to new and useful improvements in juice extractors.

In extracting juice from lemons, limes and the like for making drinks at soda water fountains it is customary to employ two separate implements, one for extracting the juice and the other, a strainer placed over the glass. It is necessary to place the strainer on the glass and much time is lost in changing from one glass to another.

It is the object of this invention to provide a device in which an extractor and a strainer are combined in one implement and so constructed as to be quickly operated.

Finally the object of the invention is to provide means of the character described that will be strong, durable, efficient, and easy of operation, simple and comparatively inexpensive to construct, and also in which the several parts will not be likely to get out of working order.

With the above and other objects in view, the invention has relation to certain novel features of construction and operation, an example of which is described in this specification and illustrated in the accompanying drawings, wherein:

Figure 1. is a plan view with the extractor partly open and the strainer member swung to one side, Fig. 2. is a side elevation with the strainer member swung under the extractor, Fig. 3. is a longitudinal sectional view of the strainer member, Fig. 4. is a transverse sectional view on the line S—S of Fig. 1 with the strainer member swung under the extractor.

In the drawings the numerals 1 and 2 designate the members of an ordinary juice extractor which are hinged together and are of the usual construction. On the member 2 a guard plate 3 is secured. The extractor is not claimed as a novel element of this invention and may be purchased on the open market, being commonly known as a "lemon squeezer."

It is customary at soda fountains to cut the lemons and limes in half and place the halves on a board. When it is desired to use one the extractor is opened as shown in Fig. 1 and placed about the half lemon or lime, the members 1 and 2 being forced together sufficient to grasp the article. A suitable strainer is placed over the glass and the extractor positioned over the strainer when the members are brought together and the juice extracted and passed through the strainer. If it should be desired to extract juice for more than one glass the server must remove the strainer from the first glass and place it on the second glass and so on.

In carrying out my invention I attach the strainer to the extractor so that the limes and lemons may be grasped in the usual way and juice deposited in several glasses without the necessity of the server removing either hand from the handles of the extractor.

I provide a strainer member 4 made of metal or other suitable material and having a shape somewhat similar to the tapered form of the extractor when its members are partially open as shown in Fig. 1. The strainer member is concaved or dished and curves from all edges downward to the center. A marginal flange 5 surrounds the strainer at its outer edge and is adapted to lie flat against the under sides of the members 1 and 2 as shown in Fig. 4.

At each end of the strainer hinge rods 6 are secured thereto by flanges 7 bent around the rods and which flanges are continuations of the flange 5. The rods are bent at right angles so as to pass a short distance up the outer side of the member 2 of the extractor and are provided with opposed trunnions 9 which pass through staples 8 driven into the side of the member 2. The staples 8 hold the strainer member against longitudinal displacement and permit the strainer member to be freely swung as will be hereinafter described.

The trunnion 9 nearest the handle of the member 2 is provided with an extension 10 passing through a staple 11 also driven into the side of the member 2. Between the staples 8 and 11 the extension is provided with an off-set or crank-loop 12 which when the strainer is under the extractor, is directed toward the lower end of the member 2 and lies flat against the side of the same. A flat spring 13 secured at its upper end to the side of the member 2 has its lower free end engaging over the off-set 12 and acts to hold the strainer in position. The extension 10 terminates in a right angular crank lever 14 which is slightly off-set from the handle of the member 2 as shown in Fig. 2. It is obvious that when the strainer member is swung under the extractor as shown in Figs. 2 and 4, it would interfere with the operation of grasping the limes and lemons between the members of the extractor. Therefore when it is desired to grasp the article the server places his thumb or finger upon the crank lever 14 and by swinging the same upward swings the strainer member outward and to one side as shown in Fig. 1. When the crank lever is swung the off-set 12 is also swung raising the spring 13 and then lowering said spring as the off-set comes to rest against the side of the member 2 and directed toward the upper end of said member. After the lime or lemon has been grasped in the extractor the server presses the crank lever 14 downward which swings the strainer member into position under the extractor so that it is merely necessary to hold the extractor over the glass and strain the juice through the strainer member which will catch seeds and foreign matter and which may be readily dumped from the strainer before the next lime or lemon is grasped.

What I claim is:

1. The combination with a juice extractor having two members hinged together at their ends, of a strainer member hinged to one of said members, an operating lever having connection with the strainer, a projection extending from the lever, and a spring member engaging the projection.

2. A strainer member for a juice extractor comprising a body having a marginal flange and a depressed portion extending from the flange and provided with perforations, hinge members connected to the body for mounting the same on an extractor, a projection provided on one of the hinge members, a spring member engaging the projection, and a crank lever having connection with the hinge member provided with the off-set.

3. The combination with a juice extractor having two members hinged together, of a perforated strainer member, hinge members connected to the strainer member and hinged on one of the members of the extractor, a lever arm connected to the strainer member, and a spring member for holding the strainer member in position.

4. The combination with a juice extractor having two members hinged together, of a perforated strainer member, hinge members connected to the strainer member and pivoted on the side of one of the members of the extractor, the strainer member normally lying in contact with the undersides of the extractor members, an off-set provided on one of the hinge members, a flat spring secured to one of the extractor members and extending over the off-set, and a crank lever connected to the member having the off-set.

In testimony whereof I have signed my name to this specification in the presence of two subscribing witnesses.

WINFIELD B. WILLIAMS.

Witnesses:
  H. P. HANCOCK,
  RUBIE BANDER.